United States Patent
Kuhns

(10) Patent No.: US 6,419,431 B1
(45) Date of Patent: Jul. 16, 2002

(54) ADJUSTABLE SUPPORT FOR TRANSPORT

(75) Inventor: Abe B. Kuhns, Arthur, IL (US)

(73) Assignee: E-Z Trail, Inc., Arthur, IL (US)

( * ) Notice: Subject to any disclaimer, the term of this patent is extended or adjusted under 35 U.S.C. 154(b) by 0 days.

(21) Appl. No.: 09/731,146

(22) Filed: Dec. 6, 2000

(51) Int. Cl.$^7$ ................................................ B60P 7/08
(52) U.S. Cl. .......................... 410/2; 410/77; 410/44; 410/156; 56/228
(58) Field of Search .......................... 410/2, 77, 44, 410/156, 45, 80; 56/228, 473.5; 280/789, 781, 656, 35, 111, DIG. 15; 248/674, 675, 225.11

(56) References Cited

U.S. PATENT DOCUMENTS

| | | | |
|---|---|---|---|
| 3,058,756 A | | 10/1962 | Holsclaw |
| 4,105,219 A | | 8/1978 | Gerson |
| 4,184,694 A | * | 1/1980 | Porter .......................... 410/44 |
| 4,268,211 A | | 5/1981 | Schwebke |
| 4,371,299 A | * | 2/1983 | Cain et al. .................... 410/44 |
| 4,770,577 A | * | 9/1988 | Farris ............................ 410/2 |
| 5,040,825 A | | 8/1991 | Kuhns |
| 5,361,569 A | * | 11/1994 | Schupmar et al. ............ 56/228 |
| 5,374,082 A | * | 12/1994 | Smith ........................ 410/2 X |
| 5,529,447 A | * | 6/1996 | Brung et al. .................... 410/2 |
| 5,785,472 A | * | 7/1998 | Smith et al. .................. 410/77 |
| 6,047,989 A | * | 4/2000 | Wood ....................... 410/44 X |

OTHER PUBLICATIONS

Jerry Johnson & Associates, "Head Hauler", undated, 1 page.
May Wes Manufacturing, Inc., "Movemaster", Aug. 1998, 1 page.
McCurdy, "McCurdy Combine Header Transport", Copr. 1982, 1 page.
UFT, "Combine Head Trailer", undated, 1 page.
Killbros, "Utility Transport", undated. 1 page.

* cited by examiner

*Primary Examiner*—Stephen T. Gordon
(74) *Attorney, Agent, or Firm*—Cook, Alex, McFarron, Manzo, Cummings & Mehler, Ltd.

(57) ABSTRACT

A combine header transport may be rapidly and easily adjusted to support a wide variety of kinds and shapes of headers for transport. The transport includes an inclined bracket having a slotted sloped surface. A rail having a plate affixed thereto overlies the sloped surface and a second plate underlies the sloped surface. The underlying plate has an offset at one end which receives a first coupling to the overlying plate, and a second hooked coupling couples the other ends of the plates together. When the second coupling is relaxed, the rail may be readily slid along the sloped surface to effect rapid and simultaneous adjustment of the rail in both the transverse horizontal direction and in vertical elevation, and the adjustment may be accomplished without a wrench or other tool.

22 Claims, 2 Drawing Sheets

ADJUSTABLE SUPPORT FOR TRANSPORT

BACKGROUND AND SUMMARY OF THE INVENTION

The present invention relates to a transport for transporting combine headers such as corn, bean and grain headers or tables, and to an adjustable support therefor.

It is desireable to be able to detach the headers from combines to permit safe transit of the combine on public roadways. If the header is not detached from the combine, the overall combine assembly with its header typically would be too large to permit such safe transit. Accordingly, various transports have been known in the past to support the detached combine header and permit its transport separately from the combine. Such headers are of widely varying sizes and shapes depending upon their use, e.g. corn, bean or grain headers, and the identity of their manufacturer. Thus, the prior header transports have included adjustable mechanisms to permit the transport to be adjusted to accept the various shapes and sizes of headers which may need to be transported at different times.

These adjustable transport mechanisms have taken many structural forms and shapes from the very simple to the quite complex. In their simpler structural form, adjustability is achieved by a multiplicity of brackets, bolts and holes which permit adjustment of header support rails or brackets on the chassis of the transport in both the horizontal transverse direction relative to the chassis and in vertical elevation to accommodate the various sizes and shapes of the headers. However, these simpler adjustment assemblies are usually capable of adjustment in only one direction at a time, i.e. either in the horizontal or vertical direction. Thus, although these adjustment mechanisms are structurally simple, in practice they are difficult and time consuming to adjust to fit the particular shape of the combine header to be transported due to the multiple individual and incremental adjustments which are needed in order to accommodate the transport support rails or brackets to fit the size and shape of the particular header. Moreover, because of the multiple adjustments required, adjustment becomes complex and two people are usually required to perform the necessary adjustments.

More structurally complex scissors-type assemblies have also been employed in the past for adjustment of the header support rails or brackets. However, these scissors-type assemblies also usually require the loosening, moving and tightening of a number of bolts and the performance of multiple steps in order to accomplish adjustment in both the horizontal and vertical directions. Again usually more than one person is needed to perform the complex adjustments. Moreover, the scissors-type assemblies, because of their scissoring action, can also be dangerous to the personnel making the adjustments, and these assemblies are frequently excessively high off the roadway resulting in instability during transport.

A combine header transport which is both simple in construction and use and overcomes the several disadvantages experienced in the prior art header transports is described in my U.S. Pat. No. 5,040,825, the disclosure of which is incorporated herein by reference. The header transport of my patent includes an adjustment assembly in which the support for the header may be rapidly and easily simultaneously, rather than incrementally, adjusted in both the transverse horizontal direction and in vertical elevation simply by the loosening and tightening of only a few bolts. That adjustment assembly is so simple in construction and use that adjustment may be accomplished easily by a single person and without the hazards attendant in the scissors-type assemblies. Moreover, that header support structure has a low profile and supports the header low to the roadway thus substantially improving stability during transport.

The adjustable support of the present invention is an improvement of the assembly disclosed in my prior patent. The adjustable support of the present invention not only enjoys all of the advantages which are enjoyed by my prior adjustment assembly, but further enjoys additional advantages. One such additional advantage is that it is only necessary to loosen one bolt rather than two when it is desired to adjust the support. Another advantage is that a wrench is not needed to effect adjustment, and adjustment is faster and easier. Still another advantage of the adjustment assembly of the present invention is that the possibility of lost parts, such as nuts, bolts, plates, etc., is substantially reduced because all of the parts of the assembly continue to be maintained collectively together during the adjustment procedure.

In one principal aspect of the present invention, a transport for transporting a large bulky object has a chassis on wheels for rollably supporting the chassis, and the chassis is formed of rails including at least a pair of rails spaced longitudinally from each other and extending transversely of the chassis. A surface is associated with at least one of the chassis rails which has an elongate slot extending substantially parallel to the surface. A support element adapted to support the object is provided and an adjustable mounting mounts the support element for movement along the slot in a direction substantially parallel to the surface to effect movement of the support element to permit adjustment of the support element to support one of the spaced portions of the object. The adjustable mounting comprises first and second plates respectively overlying and underlying the surface and its slot, and the first plate overlying the slot is fixed to the support element. First and second couplings spaced from each other extend between the first and second plates and through the slot to releaseably clamp the plates in the slot to prevent movement of the plates along the slot. An offset is located on at least one of the plates from which the first coupling extends to the other plate.

In another principal aspect of the present invention, the offset is located adjacent an end of the one plate.

In still another principal aspect of the present invention, the offset is on the second plate underlying the slot.

In still another principal aspect of the present invention, the second coupling may be relaxed to permit moveable adjustment of the support element without relaxation of the first coupling.

In still another principal aspect of the present invention, the second coupling comprises a fastener one end of which is adapted to engage the second underlying plate, and an opposite end of which is adapted to releaseably tighten the fastener to the first overlying plate.

In still another principal aspect of the present invention, the fastener has a hook adjacent the one end of the fastener for engaging the second underlying plate.

In still another principal aspect of the present invention, the opposite end of the fastener is threaded, and a handle nut is positioned on the threaded opposite end.

In still another principal aspect of the present invention, at least one bracket is positioned on one of the chassis rails, the bracket has a sloped surface and the slot extends substantially parallel to the surface.

In still another principal aspect of the present invention, the transport is constructed and arranged to transport a combine header.

These and other objects, features and advantages of the present invention will be more clearly understood through a consideration of the following detailed description.

BRIEF DESCRIPTION OF THE DRAWINGS

In the course of this description, reference will frequently be made to the attached drawings in which.

BRIEF DESCRIPTION OF THE PREFERRED EMBODIMENT

Figures 1, 2:
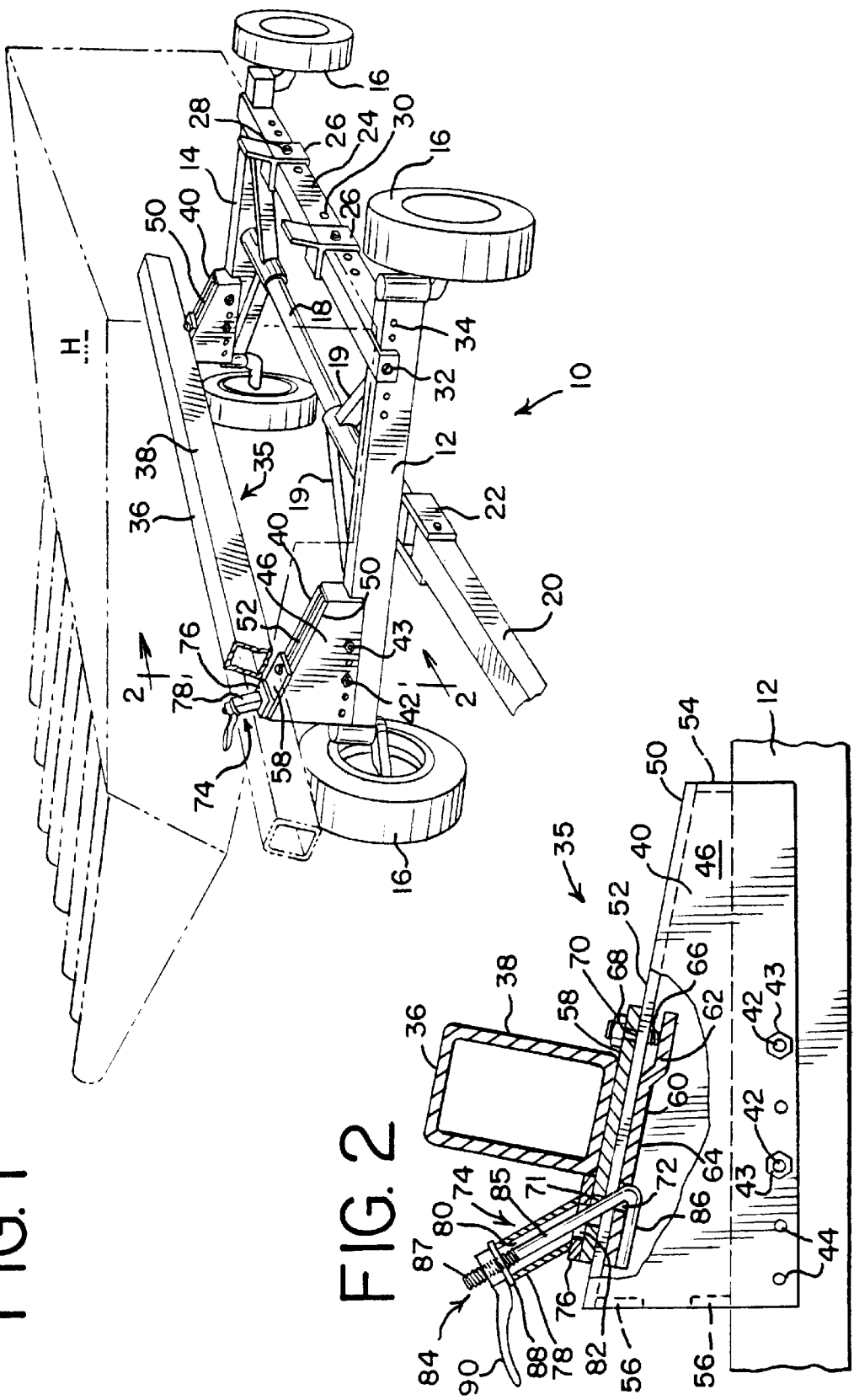
FIG. 1 is a perspective view of a combine header transport constructed in accordance with the principles of the present invention, and showing the placement thereon of a typical combine header.
FIG. 2 is a partially broken, cross-sectioned end elevational view of a preferred embodiment of adjustable mounting assembly for the header support constructed in accordance with principles of the present invention, and as viewed substantially along lines 2—2 of FIG. 1.
Figure 3:
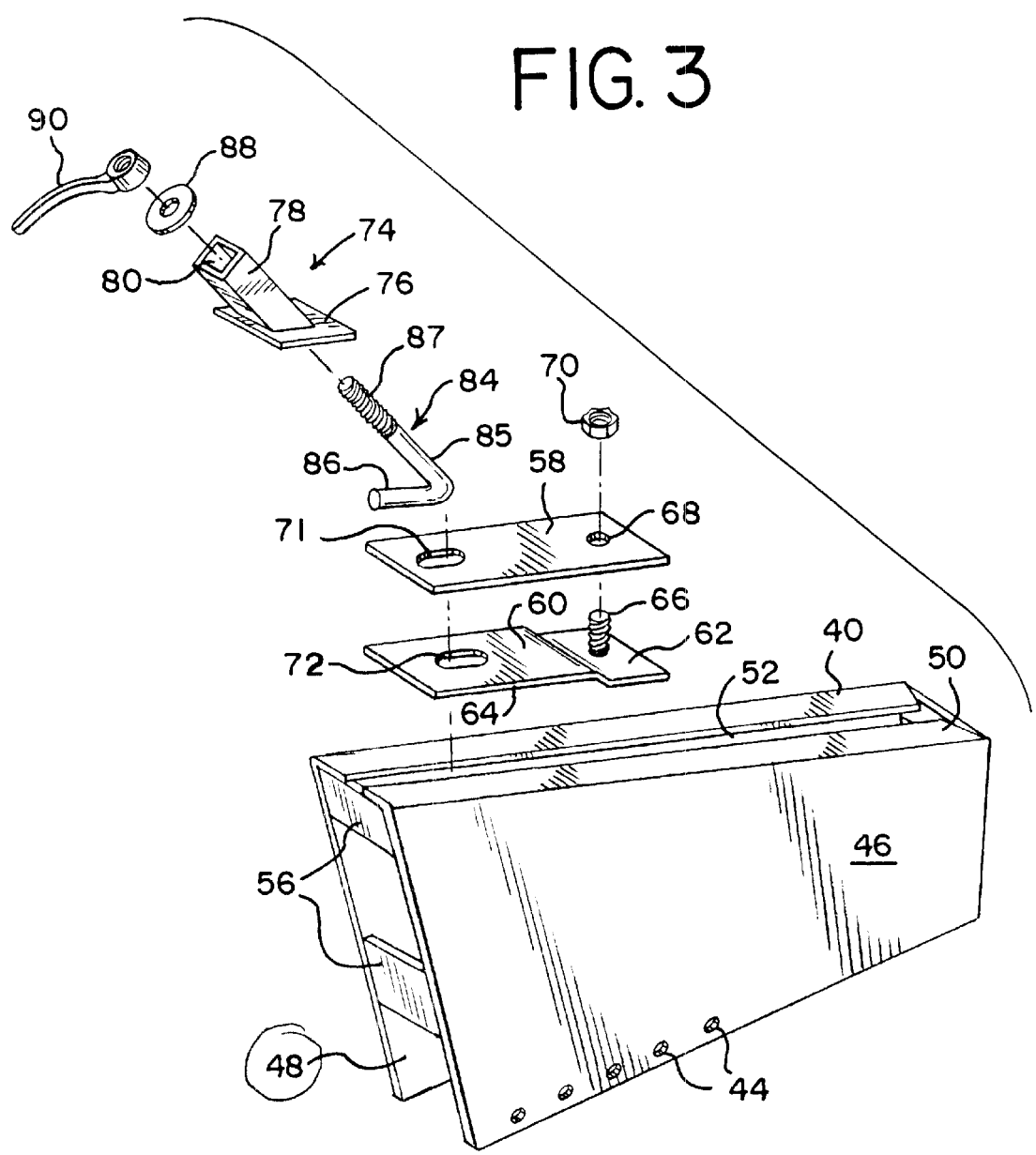
FIG. 3 is an exploded perspective view of the mounting assembly.

A preferred embodiment of combine header transport constructed in accordance with the principles of the present invention is shown in FIG. 1. The transport comprises a chassis, generally 10, having a pair of rails 12 and 14 which are longitudinally spaced from each other along the chassis and which extend transversely thereof. Wheels 16 are mounted at the ends of the rails 12 and 14 at the four corners of the chassis by suitable and conventional mountings, including bearings and the like (not shown) to rollably support the chassis. The rails 12 and 14 are firmly coupled to each other by a center beam 18 to form the chassis frame for the transport. Although only a single center beam 18 is shown, it will be understood that more than one beam may be provided if desired. In the single beam construction shown, diagonal struts 19 are also preferably provided which extend between the center beam 18 and the front and rear rails 12 and 14 to strengthen the transport chassis frame.

A tongue 20 is also coupled to the front rail 12 by a conventional tongue coupling 22 which permits the tongue to both pivot and swivel relative to the rail 12. The tongue 20 may either be of fixed or adjustable length. The tongue may be attached either to the combine itself during transit or to a separate tractor to transport the header.

A rail 24 is also preferably positioned to extend longitudinally of the chassis 10 between the front rail 12 and the rear rail 14. One or more header support rest brackets 26 for supporting a portion of the underside of the header H are adjustably mounted on the rail 24 by bolts 28 which may be selectively positioned in a plurality of holes 30, as shown in FIG. 1. Accordingly, the support brackets 26 may be adjustably located along the length of the rail 24. The rail 24 is also preferably adjustably mounted to the rails 12 and 14 by bolts 32 which extend through one or more holes 34 in the rails 12 and 14, as best shown in FIG. 1. Accordingly, not only may the support brackets 26 be adjustably positioned longitudinally along the rail 24, but also the rail 24 itself may be adjustably positioned transversely of the chassis.

The adjustable support assembly 35 of the invention includes a second header rest support, generally 36, which is also mounted on the chassis. This header support 36 is spaced transversely from the rail 24 to support another portion of the underside of the header H as shown in FIG. 1. The header support 36 is adapted to be adjusted in both the transverse horizontal direction and in vertical elevation as will be more fully described to follow.

The header rest support 36 preferably comprises a rail 38 also extending longitudinally of the chassis. This rail 38 is mounted on an inclined bracket 40 which, in turn, is mounted by a pair of bolts 42 which extend through holes in the rails 12 and 14 and nuts 43. The bolts 42 preferably extend all of the way through the rails 12 and 14 to permit ready removal and selective positioning in a few of the several selected holes 44 in the inclined bracket 40. Due to the ability to select between the plurality of holes 44, the inclined bracket 40 is also capable of selective adjustment transversely along the rails 12 and 14.

The inclined bracket 40 comprises a pair of generally trapazoidally shaped sides 46 which extend downwardly and are spaced from each other so as to straddle the thickness of the rails 12 and 14. An upper sloped surface 50 extends between the inclined bracket sides 46 and slopes downwardly in the direction of rail 24. The sloped surface 50 is preferably defined by bending over the upper edges of the sides 46 so as to define a sliding surface having a slot 52 preferably extending along the length of the sloped surface. The sides 46 and 48 are preferably held in rigid spaced relationship to each other and in straddling relationship to the rails 12 and 14 by end walls 54 and 56, as best seen in FIG. 2.

The rail 38 is adjustably mounted to the sloped surface 50 of the inclined bracket 40 by a pair of plates 58 and 60 as best seen in FIG. 2. Plate 58 overlies the sloped surface 50 and the slot 52, as best seen in FIGS. 1 and 2, and is fixedly attached to the underside of the rail 38, such as by welding (not shown). Plate 60 underlies the sloped surface 50 and the slot 52.

The transport chassis and adjustable support assembly thus far described are as disclosed in my aforementioned U.S. Pat. No. 5,040,825. In that adjustable bracket assembly, a wrench or other appropriate tool is needed to adjust the header support 36 along the sloped surface 50 and several nuts or bolts must be manipulated to perform and complete that function.

In the adjustable support assembly 35 of the present invention, the lower plate 60 includes an offset portion 62 which is at a different elevation than the remaining main portion 64 of the plate 60. A threaded stud 66 is preferably fixed to the upper surface of the offset 62, such as by welding, and the stud extends upwardly through a hole 68 in the upper plate 58 to threadedly receive a nut 70.

The other ends of the plates 58 and 60 each include a slotted opening 71 and 72. A member 74 is also provided which includes a plate 76 and an inclined bushing 78 fixed to the plate 76 and extending upwardly therefrom. The bushing 78 includes a passage 80 therethrough which opens to an opening 82 in the plate 76 as best seen in FIG. 2. Although the bushing 78 is shown as having a square cross section, it will be appreciated that it may have other cross sectional shapes including round.

A hooked fastener 84 is provided to secure the adjustable support assembly of the invention in its desired adjusted position. The hooked fastener 84 includes a longitudinally extending leg 85 which has a hooked portion 86 at one end, and is threaded at 87 at the other end. The longitudinal leg 85 is passed from beneath plate 60 through its slotted opening 72, through the slot 52 in the sloped surface 50, through the slotted opening 71 in plate 58, through the opening 82 in the plate 76 of the member 74, and through the passage 80 so that its threaded end 87 extends from the top of the bushing 78, as shown in FIG. 2, and so that its hooked end 86 engages the bottom side of the plate 60. A washer 88 is then preferably installed over the threaded end 87 of the hooked fastener 84, and a handle nut 90 is threaded down upon the threaded end against the washer 88 to pull the entire adjustment assembly together as best seen in FIG. 2.

If it is desired to adjust the header support 36 up or down the sloped surface 50 of the inclined bracket 40, all that need be done is to unscrew the handle nut 90 only to the extent necessary to loosen the hooked fastener 84. Loosening of the assembly for adjustment is simplified in the present invention because nothing need be done with the nut 70 on the stud 66 due to the provision of the offset 62 on the plate 60. Moreover, the handle nut 90 need not be removed from the threaded end 87, but only loosened to the extent necessary to permit the header support 36 and the plates 58 and 60 to be slid up or down the sloped surface 50. Once the header support 36 has been positioned in its desired position on the sloped surface 50, the handle nut 90 is simply tightened to secure the header support in its desired position.

From the forgoing description, it will be appreciated that adjustment of the header support 36 may be accomplished easily and quickly without the need for wrenches or other tools. As previously discussed, nothing even need be done to the nut 70 to accomplish the adjustment because the offset 62 is not clamped to or frictionally engage the underside of the inclined bracket 40. Moreover, because none of the components of the assembly need to or should be separated from each other, the possibility of lost parts is substantially reduced.

It will also be appreciated that during adjustment, the rail 38 is capable of simultaneous adjustment in both the transverse direction relative to the chassis as well as in vertical elevation, and that the adjustment steps of the assembly of the present invention are so simple that they may be readily performed in the field by a single person. Moreover, the adjustment support assembly of the present invention avoids the hazards to personnel which existed in some of the prior scissor-type adjustment assemblies and is capable of an exceptionally low profile and excellent stability during the transport.

It will be understood that the embodiment of the present invention which has been described is merely illustrative of one of the applications of the principles of the invention. Numerous modifications may be made by those skilled in the art without departing from the true spirit and scope of the invention.

I claim:

1. A transport for transporting a large bulky object, the transport having a chassis on wheels for rollably supporting the chassis, the chassis being formed of rails including at least a pair of rails spaced longitudinally from each other and extending transversely of the chassis, a surface associated with at least one of the chassis rails and having an elongate slot extending substantially parallel to the surface; a support element adapted to support the object; an adjustable mounting which mounts the support element for movement along the slot in a direction substantially parallel to the surface to effect movement of the support element to permit adjustment of the support element to support one of spaced portions of the object, and wherein the adjustable mounting comprises first and second plates respectively overlying and underlying said surface and its said slot, the first plate overlying the slot being fixed to the support element, and first and second couplings spaced from each other and extending between the first and second plates and through the slot to releaseably clamp the plates at the slot to prevent movement of the plates along the slot; wherein the improvement comprises:

an offset on at least one of said plates from which said first coupling extends to the other plate.

2. The transport of claim 1, wherein said offset is located adjacent an end of said one plate.

3. The transport of claim 1, wherein said offset is on said second plate underlying said slot.

4. The transport of claim 1, wherein said second coupling may be relaxed to permit moveable adjustment of said support element without relaxation of said first coupling.

5. The transport of claim 4, wherein said second coupling comprises a fastener, one end of which is adapted to engage said second underlying plate, and an opposite end which is adapted to releaseably tighten the fastener to the first overlying plate.

6. The transport of claim 5, wherein said fastener has a hook adjacent said one end for engaging said second underlying plate.

7. The transport of claim 6, wherein said opposite end of said fastener is threaded, and a handle nut is positioned on said threaded opposite end.

8. The transport of claim 5, wherein said opposite end of said fastener is threaded, and a handle nut is positioned on said threaded opposite end.

9. The transport of claim 5, wherein said offset and second coupling are located adjacent opposite ends of said one plate.

10. The transport of claim 5, wherein said offset is on the plate underlying the slot.

11. The transport of claim 1, wherein said offset is located adjacent an end of said one plate and is one said second plate underlying said slot; said second coupling may be relaxed to permit movable adjustment of said support element without relaxation of said first coupling, and said second coupling comprises a fastener, one end of which has a hook which is adapted to engage said second underlying plate, and an opposite end of said fastener is threaded to releaseably tighten the fastener to the first overlying plate, and a handle nut is positioned on said threaded opposite end.

12. The transport of claim 11, wherein said offset and second coupling are located adjacent opposite ends of said one plate.

13. The transport of claim 1, comprising at least one bracket on one of the chassis rails, said bracket having a sloped surface and said slot extending substantially parallel to said surface.

14. The transport of claim 13, wherein said slot is in said sloped surface.

15. The transport of claim 13, including at least a pair of said brackets spaced from each other longitudinally of said chassis.

16. The transport of claim 13, including an adjustable mounting means which mounts said inclined bracket for transverse movement on the chassis.

17. The transport of claim 13, wherein said first and second plates are selectably slidable along said sloped surface to adjust the position of said support element and clamp said support element to said sloped surface when a desired position has been achieved.

18. The transport of claim 13, wherein said transport is constructed and arranged to transport a combine header.

19. The transport of claim 1, wherein said transport is constructed and arranged to transport a combine header.

20. The transport of claim 5, wherein said transport is constructed and arranged to transport a combine header.

21. The transport of claim 11, a pair of brackets spaced from each other longitudinally of said chassis on one of the chassis rails, said bracket having a sloped surface and said slot is in said surface, and said first and second plates are selectably slidable along said sloped surface to adjust the position of said support element and clamp said support element to said sloped surface when a desired position has been achieved.

22. The transport of claim 21, wherein said transport is constructed and arranged to transport a combine header.

* * * * *